US012766449B2

(12) United States Patent
Mason et al.

(10) Patent No.: US 12,766,449 B2
(45) Date of Patent: Oct. 20, 2026

(54) MIST TRAP

(71) Applicant: Edwards Limited, Burgess Hill (GB)

(72) Inventors: Edward Mason, Clevedon (GB); Harry William Michael Lampert, Clevedon (GB); Trevor James Davies, Clevedon (GB); Kaelan Meehan, Clevedon (GB); Matthew Fraser Davidson, Clevedon (GB); Daniel Kenneth Knutson, Sanborn, NY (US); Samuel Kevin Canterbury, Sanborn, NY (US)

(73) Assignee: Edwards Limited, Burgess Hill (GB)

( * ) Notice: Subject to any disclaimer, the term of this patent is extended or adjusted under 35 U.S.C. 154(b) by 232 days.

(21) Appl. No.: 18/722,286

(22) PCT Filed: Dec. 21, 2022

(86) PCT No.: PCT/GB2022/053334

§ 371 (c)(1),
(2) Date: Jun. 20, 2024

(87) PCT Pub. No.: WO2023/118860

PCT Pub. Date: Jun. 29, 2023

(65) Prior Publication Data

US 2025/0196036 A1 Jun. 19, 2025

(30) Foreign Application Priority Data

Dec. 22, 2021 (GB) ..................................... 2118727

(51) Int. Cl.
*B01D 45/06* (2006.01)
*B01D 45/08* (2006.01)

(52) U.S. Cl.
CPC ............ *B01D 45/06* (2013.01); *B01D 45/08* (2013.01); *B01D 2247/10* (2013.01)

(58) Field of Classification Search
CPC .... B01D 45/06; B01D 45/08; B01D 2247/10; B01D 47/14; B01D 50/40; B08B 9/032; F24F 13/08
See application file for complete search history.

(56) References Cited

U.S. PATENT DOCUMENTS 3,710,554 A 1/1973 Brookman
4,522,233 A * 6/1985 Mojadad .............. F16K 11/083
137/625.2

(Continued)

FOREIGN PATENT DOCUMENTS

CN 104606958 A 5/2015
CN 104606960 A 5/2015

(Continued)

OTHER PUBLICATIONS

British Search Report dated Dec. 19, 2022 for corresponding British application Serial No. GB2118727.3, 4 pages.

(Continued)

*Primary Examiner* — Dung H Bui
(74) *Attorney, Agent, or Firm* — Theodore M. Magee; Westman, Champlin & Koehler, P.A.

(57) ABSTRACT

This application relates to a mist-trap for a wet-scrubber abatement system. The mist trap comprises a demisting chamber having a gas inlet for receiving mist-laden exhaust gas from the wet-scrubber abatement system, a liquid capture surface on which the mist droplets may coalesce to form a liquid, and a gas outlet through which relatively dry gas may exit the chamber. The mist trap is configured such that at least a first portion of the captured liquid exits the chamber via the gas inlet to return to the wet-scrubber abatement system. The application also relates to a water-collecting baffle, an abatement system, and a method of (Continued)

moderating particulate build-up in a primary flow channel of an exhaust draw amplification device.

11 Claims, 7 Drawing Sheets

(56) References Cited

U.S. PATENT DOCUMENTS

| | | | | |
|---|---|---|---|---|
| 5,201,919 | A | 4/1993 | Jahn et al. | |
| 5,520,714 | A | 5/1996 | Muschelknautz | |
| 6,554,018 | B1 * | 4/2003 | Pino | E03D 3/06 137/526 |
| 2004/0255779 | A1 | 12/2004 | Trivett | |
| 2010/0325956 | A1 | 12/2010 | Dinu et al. | |
| 2012/0137884 | A1 * | 6/2012 | Steinman | F02M 25/0872 55/455 |
| 2016/0158680 | A1 * | 6/2016 | Roston | B01D 45/16 55/438 |
| 2017/0274306 | A1 * | 9/2017 | Peck | B01D 45/16 |
| 2018/0216508 | A1 * | 8/2018 | Brinker | F01M 13/00 |
| 2018/0223200 | A1 | 8/2018 | Zhou et al. | |
| 2019/0046908 | A1 | 2/2019 | Jeong et al. | |
| 2020/0332686 | A1 * | 10/2020 | Herman | B01D 50/20 |
| 2022/0134273 | A1 * | 5/2022 | Inge | B01D 45/14 95/64 |
| 2023/0381700 | A1 * | 11/2023 | Arakawa | B01D 45/08 |
| 2025/0196036 | A1 * | 6/2025 | Mason | B01D 45/06 |

FOREIGN PATENT DOCUMENTS

| | | | |
|---|---|---|---|
| CN | 108786398 | A | 11/2018 |
| CN | 111921320 | A | 11/2020 |
| GB | 2587394 | A | 3/2021 |
| JP | 2003236323 | A | 8/2003 |
| JP | 2014217809 | A | 11/2014 |
| JP | 2021137689 | A | 9/2021 |
| WO | 2009153404 | A1 | 12/2009 |
| WO | 2020226163 | A1 | 11/2020 |

OTHER PUBLICATIONS

PCT Notification of Transmittal of the International Search Report and the Written Opinion of the International Searching Authority, or the Declaration and PCT Search Report dated Mar. 15, 2023 for corresponding PCT application Serial No. PCT/GB2022/053334, 12 pages.

British Examination Report dated Jun. 23, 2022 and Search Report dated Jun. 22, 2022 for corresponding British application Serial No. GB2118727.3, 7 pages.

Japanese Notice of Reasons for Refusal, dated May 22, 2025 for corresponding Japanese application Serial No. JP2024-536450, 5 pages.

Taiwanese Office Action dated Apr. 28, 2026 and Search Report dated Apr. 24, 2026 for corresponding Taiwanese application Serial No. 111149509, 11 pages.

* cited by examiner

MIST TRAP

CROSS-REFERENCE OF RELATED APPLICATION

This application is a Section 371 National Stage Application of International Application No. PCT/GB2022/053334, filed Dec. 21, 2022, and published as WO 2023/118860 A1 on Jun. 29, 2023, the content of which is hereby incorporated by reference in its entirety and which claims priority of British Application No. 2118727.3, filed Dec. 22, 2021.

FIELD

The present invention relates to a mist-trap and in particular a mist-trap for a gas abatement system. The invention further provides a water-collecting baffle for a mist-trap, an abatement system comprising a mist-trap, and a method of moderating particulate build-up in a primary flow channel of an exhaust draw amplification device.

BACKGROUND

Abatement apparatus remove components of a process gas stream, e.g. compounds of a semiconductor or flat panel display manufacturing process, so that the abated gas stream can be more safely released into the environment.

The term wet scrubber describes a variety of abatement devices that remove pollutants from a furnace flue gas or from other gas streams. In a wet scrubber, the polluted gas stream is brought into contact with the scrubbing liquid, such as water, by spraying it with the liquid, by forcing it through a pool of the liquid, or by some other contact method, so as to remove the pollutants. Wet scrubbers may also remove solid particles by capturing them in the liquid.

Droplets in the scrubbed exhaust gas stream are separated before leaving the wet scrubber by means of sub-component known as a mist eliminator, such as a mist filter or a cyclonic separator. The retained scrubbing liquid and entrained pollutants are treated prior to any ultimate discharge or recycling within the plant.

FIG. 1 provides a simplified schematic of a packed tower design wet scrubber (1). The exemplified mist filter (2) is located within the main chamber (3) of packed tower. The mist filter (2) is located between the packing (5) and the outlet (4) of the packed tower main chamber (3). Thus, substantially all the mist may be removed from the exhaust gas stream (6) before it exits the main chamber (3) of the packed tower (1).

In some instances, an exhaust draw amplification device (EDAD) is employed downstream of a packed-tower wet scrubber. As its name suggests, an exhaust draw amplification device increases the gas flow velocity at the exit of the wet scrubber, directing exhaust along further ductwork for treatment and/or release into the atmosphere.

Referring to FIG. 2, a typical example of an exhaust draw amplification device (10) includes a primary flow channel (11) through which the exhaust gas flows, surrounded by a plenum (7) that has ports (8, 9) leading into the gas stream. These ports (8, 9) allow jets of high velocity compressed dry air to be introduced into the stream, increasing the overall velocity of the gas.

In the field, it has been reported that exhaust draw amplification devices may exhibit an unsatisfactory Mean Time Between Cleaning (MTBC). In some instances, the exhaust draw amplification device may accumulate powder on the internal walls of its primary flow channel and/or jet ports. This powder is typically a biproduct from the abatement and is generally a form of silica or silicon dioxide. As powder accumulates, it changes the geometry of the device and may reduce the effectiveness of the exhaust draw amplification device, particularly at increased gas stream velocities. Indeed, it has been reported that powder may accumulate to such an extent that the system may trigger an alarm and/or automatic shutdown due to poor pressure conditions.

The present invention, at least in part, addresses these and other problems with the prior art.

The discussion above is merely provided for general background information and is not intended to be used as an aid in determining the scope of the claimed subject matter. The claimed subject matter is not limited to implementations that solve any or all disadvantages noted in the background.

SUMMARY

Accordingly in a first aspect the present invention provides a mist-trap for a wet-scrubber abatement system. The mist trap comprises a demisting chamber having a gas inlet for receiving mist-laden exhaust gas from the wet-scrubber abatement system, a liquid capture surface on which the mist droplets may coalesce to form a liquid, and a gas outlet through which relatively dry gas may exit the chamber. The mist trap is configured such that at least a first portion of the captured liquid exits the chamber via the gas inlet to return to the wet-scrubber abatement system. Preferably the liquid runs out of the chamber via the gas inlet.

Upon investigation of the above-described problem, it was discovered that relatively dry gas containing small amounts of powder may pass out of the wet-scrubber and through the exhaust draw amplification device. Without being bound to any particular theory, it is believed that the introduction of compressed gas into the exhaust draw amplification device may then flash dry the powder, depositing it on the internal walls of the exhaust draw amplification device, where it may steadily build up and eventually cause blockages. The low moisture content of the gas, having already passed through a mist filter, means that the transported powder is not wet enough to be washed away by any mist remaining in the exhaust gas. Furthermore, the gas is not moist enough to wet the surfaces of the EDAD and thereby prevent evaporated powder from adhering to said surfaces.

By providing an independent mist-trap, mist may be removed from the gas stream after it has passed through the exhaust draw amplification device, rather than before. The mist-trap may capture and redirect some of this mist as liquid back towards the wet scrubber, allowing washing of ductwork/pipework between the wet scrubber and the mist-trap, including the exhaust draw amplification device's internal surfaces (such as the primary flow channel), reducing the accumulation of powder thereon.

Thus, the mist-trap may be in fluid communication with an exhaust draw amplification device and configured such that liquid exiting the chamber via the gas inlet is directed back into the exhaust draw amplification device. Thereby, the mist-trap may prevent further powder adhesion.

The demisting chamber may comprise at least one drainage outlet through which a second portion of the captured liquid exits the chamber. The demisting chamber may comprise two or more such drainage outlets. Preferably the at least one drainage outlet is in fluid communication with a liquid storage tank, preferably a liquid storage tank used to feed liquid into the abatement system, such as into the packed tower of a wet scrubber.

Mist-laden air may be provided by the wet-scrubber, in particular by an atomiser located within a packed tower abatement chamber of the wet-scrubber. Typically, the mist-trap is used in combination with the wet scrubber of a gas abatement system that does not include a mist eliminator. Mist-laden air may exit the wet scrubber and pass through the exhaust draw amplification device. Advantageously, this allows the mist-laden gas to wash the sidewalls of the exhaust draw amplification device as it passes therethrough from the packed tower to the mist trap. This washing action may be in addition to that of the recovered liquid flowing in a reverse direction from the mist-trap to the wet-scrubber, preferably into the packed-bed abatement chamber.

Thus, in a further aspect the invention provides the use of an aqueous mist to clean powder deposits from an exhaust draw amplification device of a gas abatement system when in use, preferably wherein the aqueous mist is routed from a packed tower wet scrubber of the gas abatement system.

In a further aspect the invention provides, an abatement system comprising an exhaust draw amplification device and a mist trap, the exhaust draw amplification device being configured to direct mist-laden gas into the mist trap and the mist-trap being configured to remove liquid from mist-laden gas. The mist-trap is further configured such that at least a portion of the liquid removed from the mist-laden gas is directed back into the exhaust draw amplification device, preferably, through the exhaust draw amplification device and into a wet-scrubber abatement chamber. Preferably, the mist-laden air is provided by the wet-scrubber. Preferably the wet scrubber comprises a packed tower that does not include a mist eliminator.

In embodiments, the abatement system may comprise a mist-trap according to the previous aspect.

Typically, the mist-trap is located vertically above the exhaust draw amplification device and/or packed-bed abatement chamber such that liquid collected by the mist-trap may run back through the exhaust draw amplification device and/or into the packed-tower abatement chamber under the influence of gravity.

In a further aspect the invention provides a method of moderating particulate build-up in a primary flow channel of an exhaust draw amplification device of a gas abatement system. The process comprises the steps of directing mist-laden air from gas abatement process through the primary flow channel of the exhaust draw amplification device; removing liquid from mist-laden gas that has exited the exhaust draw amplification device; and directing said removed liquid back into the primary flow channel of the exhaust draw amplification device in a reverse direction.

The method may be performed using a mist-trap according to the first aspect and/or the abatement system according to the preceding aspect.

In all aspects, the liquid capture surface may be provided by a baffle at least partially obstructing, preferably fully obstructing, the gas outlet of the mist trap from the gas inlet of the mist trap. Preferably, the exhaust gas must flow around the baffle on its path from the gas inlet to the gas outlet. The baffle may define one or more apertures for providing a flow path from the inlet to the outlet. Typically, in use, the one or more apertures defined by the baffle provide the sole route from the gas inlet to the gas outlet.

In embodiments, the baffle may have one or more skirts, preferably wherein the one or more apertures defined by the baffle are provided by the one or more skirts. Typically, the or each skirt is castellated. When castellated, the openings (grooves) may provide the apertures. It will however be appreciated that the one or more apertures are not necessarily limited to any particular shape or geometry.

Thus, in a still further aspect the invention provides, a water-collecting baffle for a mist-trap of a gas abatement system, the baffle comprising a generally planar main body and a skirt extending from the main body adjacent an outer periphery thereof, the skirt defining one or more apertures configured to permit gas to flow around the baffle during use, wherein the side of the planar body from which the skirt extends is configured to provide a liquid capture surface on which mist droplets may coalesce.

In all baffle containing embodiments, the size of the or each aperture may be adjustable.

In embodiments, the baffle may comprise a first portion comprising a skirt nested within a second portion also comprising a skirt. Each said skirt may define one or more apertures of the baffle and the first and second portions may be moveable relative to each other to vary the size of the one or more apertures. Preferably the first portion and second portion have a circular outer circumference, e.g. they may be disc-like and/or annular. Preferably, the skirts are castellated. Preferably, the first body is rotatable relative to the second body, preferably so as to vary the size of the one or more apertures.

In embodiments, the baffle may be configured such that, in use, the tips (e.g. the lowermost edges) of the skirt(s) are submerged in liquid recovered by the baffle.

The baffle of this aspect may be employed in any of the baffle-containing embodiments of the previous aspect(s).

For the avoidance of doubt, all aspects and embodiments may be combined mutatis mutandis.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The invention will now be described with reference to the following figures, which are intended to be non-limiting.

DETAILED DESCRIPTION

Figure 3:
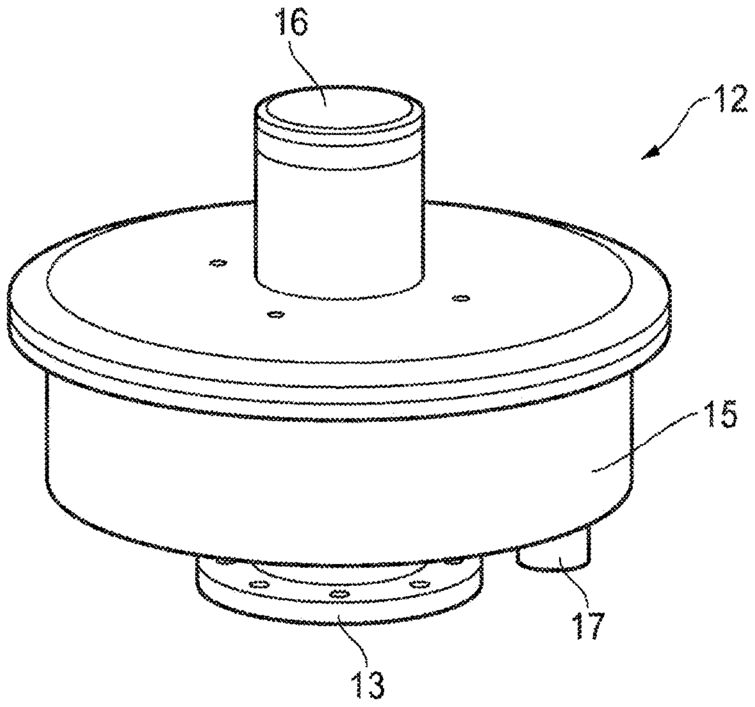
FIG. 3 shows an external view of a mist trap according to the invention.

Referring to FIG. 3, the present invention provides a mist-trap (12) for a gas abatement system. The illustrated mist-trap (12) comprises a gas inlet (13) for receiving mist-laden exhaust gas from an abatement system, such as packed tower of a wet scrubber.

The mist-trap (12) further comprises a main chamber (14) defined by a housing (15) and a gas outlet (16) through which relatively dry gas may exit the main chamber (14). The gas is relatively dry in the sense that some, preferably substantially all, of the mist may have been removed from the gas by the mist trap. The relatively dry gas may however still have a relatively high relative humidity, although not necessarily.

The housing (15), and/or the mist-trap (12) as a whole, is typically polymeric in construction, and preferably airtight. Preferably the entire exhaust gas stream passes through the mist-trap (12).

Figure 4:
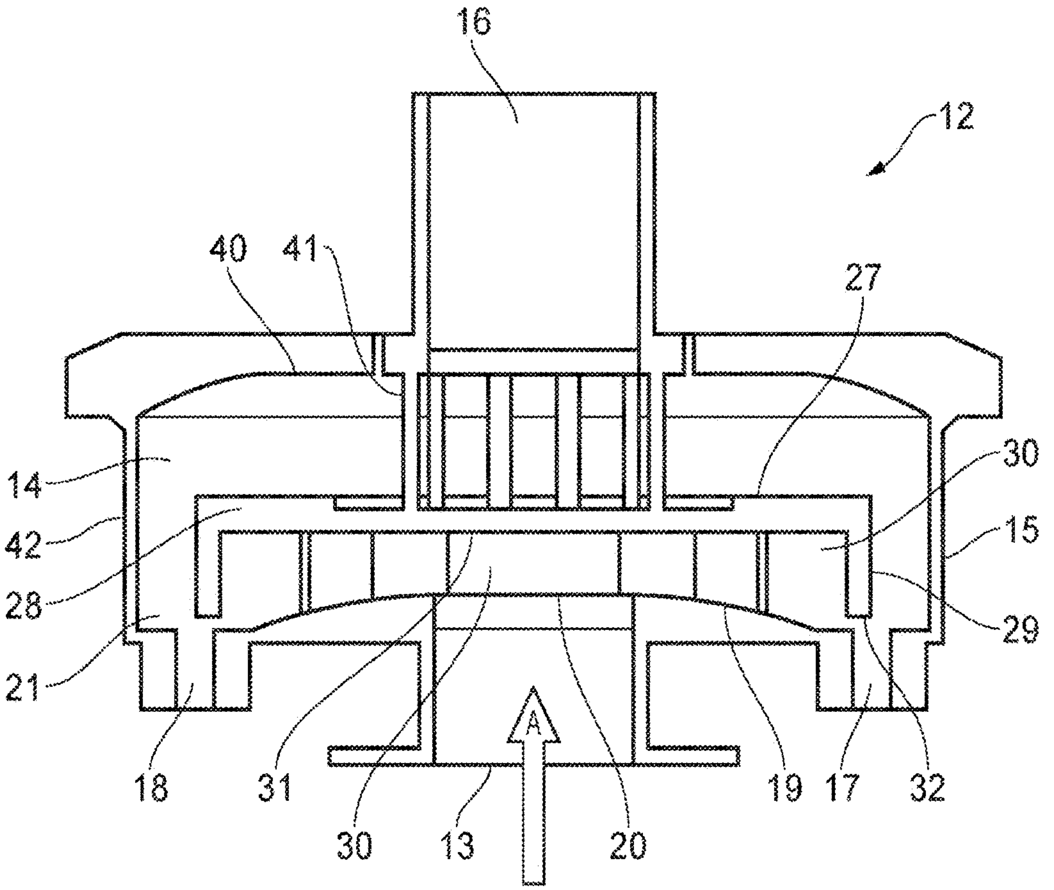
FIG. 4 shows a section through a section through a mist-trap according to the invention

The mist-trap (12) further comprises one or more drainage outlets (17, 18) through which a portion of the collected liquid may exit the main chamber (14) of the mist-trap (12). As better illustrated in FIG. 4, the mist-trap (12) may comprise two such drainage outlets (17, 18), or more. Liquid may flow out of the drainage outlets (17, 18) under the influence of gravity and/or pressure. Typically, the drainage outlet(s) (17, 18) are located in the base of the mist-trap (12). Preferably, the drainage outlet(s) (17, 18) are located lowermost in the mist-trap main chamber (14). As shown in FIG. 4, to aid drainage the base (19) of the mist-trap (12) may be configured to direct liquid towards the drainage outlets (17, 18). Moreover, when in use, the opening (20) of the gas inlet (13) may be raised relative to the drainage holes (17, 18). In the illustrated example, the base (19) of the mist-trap (12) is in the form of a frustum cone. The drainage holes (17, 18) are located in a trench (21) at the foot of the cone (19). The top of the cone (19) includes the opening (20) of the gas inlet (13).

Advantageously, this arrangement allows for the build-up (pooling) of liquid within the chamber (14) before said liquid begins to run back down the gas inlet (13) in a reverse direction towards the exhaust draw amplification device (10) and/or ductwork leading back to the packed tower chamber.

Figure 6:
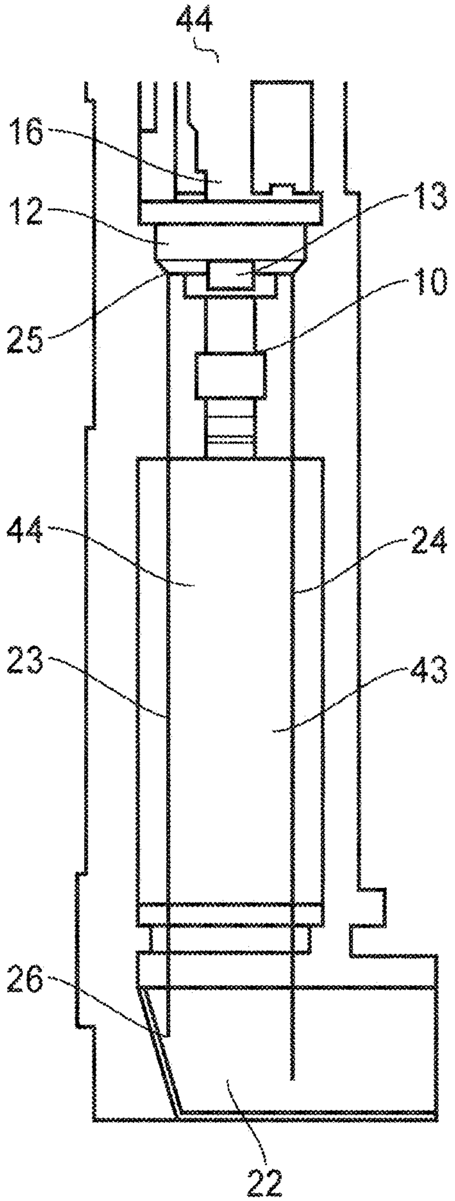
FIG. 6 shows the mist-trap and EDAD in situ in abatement system comprising a packed tower wet scrubber.

As best shown in FIG. 6, the drainage outlet(s) (17, 18) are typically connected to a collection reservoir (22), or tank, so liquid collected in the mist-trap (12) may be reused in the abatement process. Typically, a (polymer) tube (drain line) (23, 24) is employed to connect the or each drainage outlet to the collection reservoir (22). A first end (25) of the drain line (23, 24) may be connected to the drainage outlet of the mist-trap and a second end (26) of the same drain line may connected to the collection reservoir (22), preferably below the liquid level (e.g. waterline) in the reservoir (22). Preferably, the drain lines (23, 24) are connected to the collection reservoir (22) below a lower level switch. Typically, liquid moves along the drain line (23, 24) and into the collection reservoir (22) under the influence of gravity and/or pressure. As more flow is added to an exhaust draw amplification device (10) in the system, the higher the pressure in the drain line(s) (23, 24) flowing from the mist-trap (10) to the tank (22). Advantageously, powder entrained in the collected liquid may also be returned via drainage outlet(s) (17, 18) to the collection reservoir (22) along the drain line(s) (23, 24). The collection reservoir may be the liquid feed reservoir for the wet scrubber.

The mist-trap (12) further comprises a water collecting baffle (27). The baffle (27) comprises a generally planar main body (28), for instance a disc-like main body, and a skirt (29) extending from the main body (28) adjacent, preferably at, an outer periphery thereof. Preferably the skirt (29) extends from outermost edge of the main body (28). As can be better seen in FIG. 5, the skirt (29) defines a series of apertures (30). In use, exhaust gas may flow through the apertures (30), around the baffle (27) and towards the gas outlet (16). Preferably liquid coalesces on an underside (31) of the baffle (27).

Preferably, the skirt (29) is configured such that, in use, it is at least partially submerged within the pool of liquid at the base (21, 19) of the chamber (14). The pool of liquid within the outer casing (15), will present further resistance to the exhaust gas stream, thereby removing more mist from the exhaust gas.

A computational fluid dynamics investigation of the exemplified mist-trap (12) demonstrates that low velocity and high-pressure zones are created within the trap, creating eddies in the exhaust gas flow. These disturbances in velocity and flow cause the mist to be separated from the gas stream and allow it to form larger droplets that are too heavy to be transported in the gas stream. These larger droplets combine, for instance on an underside of the baffle, and pool in the base of the trap. The pool of water presents further resistance to the gas stream, thereby separating more mist.

Preferably the size of the apertures (30) may be varied. That is to say, the total cross-sectional area of the flow path past the baffle (27) may be varied. The size of the apertures (30) may be varied manually, i.e. in response to user input, and/or automatically in response to conditions in the abatement system and/or mist-trap. Increasing the size of the apertures may reduce the pressure drop in the mist trap, whereas decreasing the size of the apertures may increase the rate of mist coalescence and capture within the mist-trap.

In embodiments, a window (e.g. clear tubing) may be provided in ducting (44) downstream of the mist-trap (12). If droplets appear on the window, then not all of the mist is being captured. Accordingly, the size of the apertures (30) may be reduced until droplets no longer appear on the window. In an alternative embodiment an FTIR spectrometer may be used to analyse the exhaust gas to determine whether satisfactory levels of demisting are being achieved.

Additionally, or alternatively, if the pressure within the abatement system raises then it may be desirable to open the apertures (30) to reduce the pressure drop through the mist trap (12).

In embodiments, such determinations and aperture size adjustments may be performed automatically, i.e. without user input. For example, a processor may continuously monitor the amount of mist leaving the demister and/or system pressure, make a determination as to preferred size of the aperture(s) and instruct a controller to adjust the size of the apertures in response to said determination.

The baffle (27) may be configured such that, in use, the lowermost edge(s) (32) of the skirt (29) are submerged in liquid collected on the base (21, 19) of the main chamber. In embodiments, the position of the baffle (27) relative to the base (19) of the main chamber (14) may be varied. Thus, the depth to which the lowermost edge(s) (32) of the skirt(s) (29) are submerged may be varied and/or the size of the aperture(s) (30) may be varied. The movement of the baffle (27) relative to the base (19) of the chamber (14) may be controlled manually and/or automatically. In embodiments, positioning the baffle (27) may form a part of the automated determinations and aperture size adjustments discussed previously.

In the illustrated example, the baffle (27) has a two-part construction. In particular, the illustrated baffle (27) comprises a first portion (33) comprising a skirt (35) nested within a second portion (34) also comprising a skirt (29). The illustrated skirts (29, 35) are castellated, providing a series of skirt segments (29, 35). In the exemplified example both skirts (29, 35) define the apertures (30) of the baffle (27). The first (33) and second portions (34) are moveable (e.g. rotatable) relative to each other to vary the size of the apertures (30). In particularly, the skirt segments (29) of the second portion (34) may slide over skirt portions (35) of the first portion (33). Thus, the skirt segments (35, 29) may variously sit in side-by-side, overlapping, and radially aligned configurations, thereby altering the size of the aperture(s) (30) of the baffle (27).

In the illustrated example, the body (36) of the first portion (33) is substantially disc-like, and the body (37) of the second portion (34) is substantially annular, although it may also be disc-like. Advantageously, the illustrated arrangement provides a recess (39) on an upper surface of the baffle (27) in which powder particles may be captured for subsequent removal.

As illustrated in FIG. 4 the baffle (27) is suspended from the roof (40) of the mist-trap main chamber (14). In the example, a plurality of pillars (41) connects the baffle (27) to the chamber roof (40). In the exemplified embodiment, an annular fixing plate (38) is employed to couple the pillars (41) to the roof (40). Exhaust gas passes around the pillars (41) before exiting the chamber (14) through the gas outlet (16). In the illustrated example, the first portion (33) is fixed to the roof (40) of the chamber (14). The second portion (34) is movable relative to the first portion (33) and also the chamber wall (42). Powder particles impacting the pillars (41) may collect on the upward facing side (39) of the baffle (27).

In use, mist-laden air enters the chamber (14) through the gas inlet (13) opening (20). The mist-laded gas impacts with the underside (31) of the baffle (27) and liquid from the mist coalesces on said underside surface (31) of the baffle (27). The liquid may then run down the baffle skirt(s) (29, 35) and collect on the base (floor) (21, 19) of the chamber (14), and/or drip onto the base (19) of the main chamber and/or directly down the gas inlet (13). Mist droplets may also coalesce on other surfaces with the mist-trap (12) and similarly run towards the base (19, 21) of the mist-trap (12). As liquid begins to build-up on the base (19, 21) of the main chamber (14) some will flow into the one or more drainage outlets (17, 18).

Liquid will also flow out of the gas inlet (13) in a reverse direction to the flow direction of the exhaust gas. The flow direction of the exhaust gas is indicated by arrow A. The liquid will run along the inside surface of ductwork located upstream of the mist-trap (12) (e.g. back towards the packed tower (43)), which will, in embodiments, include an exhaust draw amplification device (10). The liquid may entrain powder or other debris it encounters on its path along the ductwork/pipework. The liquid may continue to run until it re-enters the packed tower (43) of the abatement system. Thus, powder is washed from the ducting/pipework, including the exhaust draw amplification device (10), and problematic powder build up is avoided.

Figure 1:
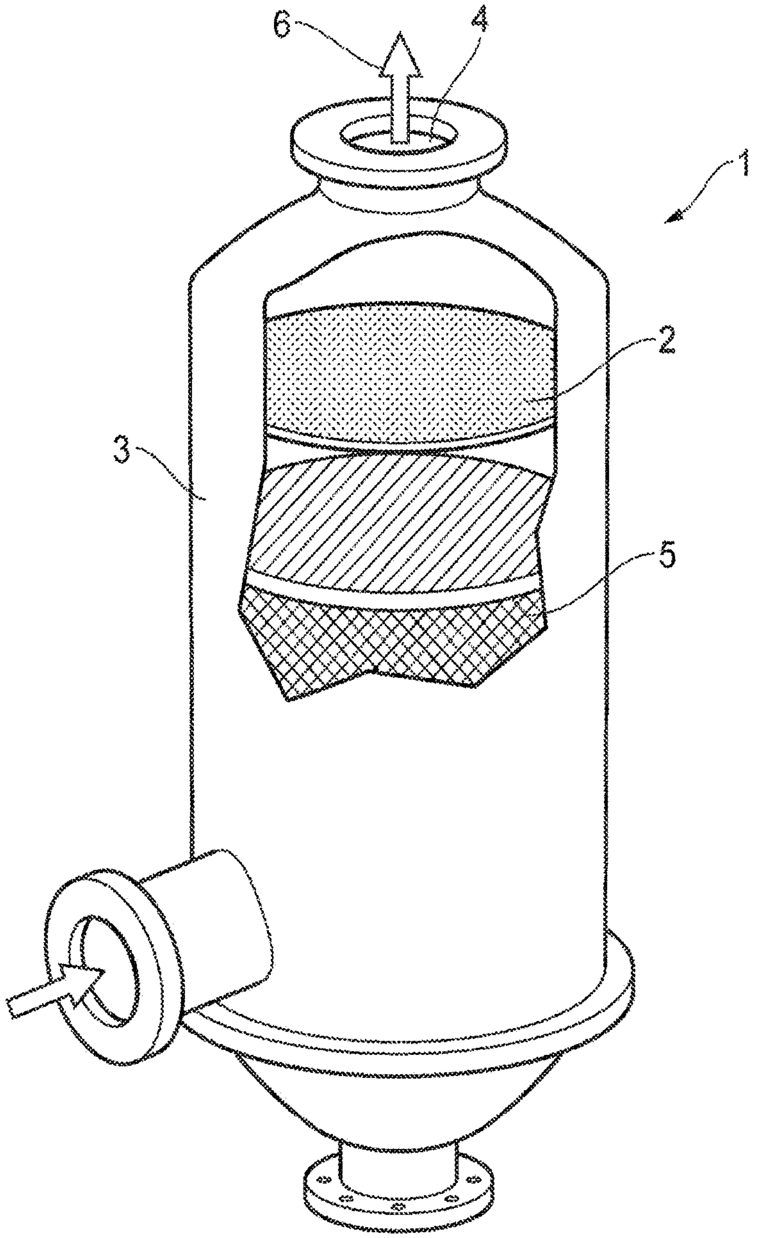
FIG. 1 shows a prior art wet scrubber.
Figure 2:
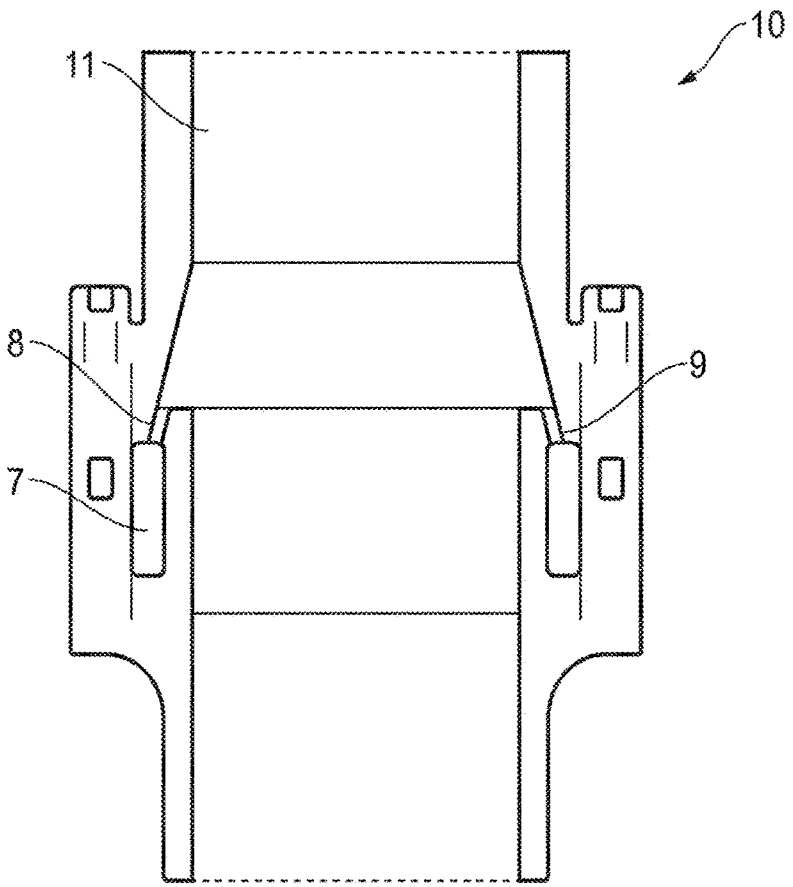
FIG. 2 shows an exhaust draw amplification device (EDAD).

FIG. 2 shows an exhaust draw amplification device (10) suitable for use in the present invention. The exhaust draw amplification device includes a primary flow channel (11) through which the exhaust gas flows, surrounded by a plenum (7) that has ports (8, 9) leading into the exhaust gas stream. These ports (8, 9) allow jets of high velocity compressed dry air to be introduced into the stream, increasing the overall velocity of the gas.

In embodiments, the primary flow channel (11) of the exhaust draw amplification device is axially aligned with the gas inlet (13) of the mist-trap (12). Preferably the inlet channel (13) of the mist-trap (12) and the primary flow channel (11) of the EDAD (10) are arranged such that they provide a continuous inwardly facing surface.

As illustrated in FIG. 6, in a preferred arrangement the mist-trap (12) is immediately adjacent the exhaust draw amplification device (10) in the abatement system, preferably the mist-trap (12) is located directly above the exhaust draw amplification device (10). Preferably, liquid collected by the mist-trap (12) flows immediately into the exhaust draw amplification device (10), preferably under the influence of gravity.

In an alternative arrangement a mist-filter may be positioned between the exhaust draw amplification device and/or within the mist-trap. This arrangement has been found to further increase the drying of the exhaust gas, whilst still washing the exhaust draw amplification device.

In embodiments, additional liquid may be pumped into the mist-trap during use, preferably such that said liquid cascades over the baffle, preferably in the form of a weir such that all the exhaust gas must pass through a curtain of said liquid. Additionally, or alternatively, liquid may be sprayed as an aerosol onto the underside of the baffle, by one or more spray nozzles, in a reverse direction into the incoming gas stream. The mist-trap may be actively or passively cooled, preferably to a temperature substantially below the temperature of the gas entering the mist-trap. Preferably, the liquid introduced into the mist-trap is cooler than the exhaust gas entering the mist-trap. Such an arrangement may advantageously wash the mist-trap, cool the gas stream further, reducing the relative humidity, and removing more powder from the gas stream. Advantageously, in arrangements including a mist-filter, the liquid pumped into the mist-trap may additionally wash the mist-filter.

The gas outlet (16) is typically connected to ductwork. The demisted (relatively dry) exhaust gas may pass along the ductwork for further treatment or, more typically, venting into the atmosphere.

For the purposes of the invention, a mist is a liquid-in-gas aerosol. Typically, the aerosol will have a diameter of about 1000 μm or less, preferably from about 2.5 μm to about 450 μm, preferably to about 250 μm, measured, for instance, using laser diffraction. The liquid is typically aqueous, e.g. water. The exhaust gas will typically comprise air. The mist is generally generated within the packed tower (43) of the wet scrubber, for instance by an atomiser, and drawn along ductwork to the mist-trap. The temperature in the mist-trap is typically that of ambient conditions or below. The temperature may preferably be from about 5° C. to about 30° C., more preferably from about 15° C. to about 25° C., 20° C. being an example. Preferably, the temperature is such that significant condensation does not occur in ductwork downstream of the mist-trap. Generally, the water temperature within the packed tower chamber will be from about 10° C. to about 20° C., such as from about 14° C. to about 17° C. Typically, the gas temperature is from about 10° C. to about 20° C., such as from about 14° C. to about 15° C.

The skilled person will appreciate that the dimensions of the mist-trap may be varied depending upon the size of the remainder of the abatement apparatus (in particular exhaust draw amplification device), the amount of mist requiring removal, onsite volume constraints and the like.

The mist-trap will generally have a diameter greater than the diameter of the gas inlet and/or gas outlet. Typically, the main chamber of the mist-trap will have an internal diameter of less than about 100 cm, preferably less than about 50 cm. The diameter of the main chamber will generally be greater than about 15 cm, preferably greater than about 25 cm. The baffle will usually have a diameter greater than the diameter of the gas outlet and/or gas inlet. The ratio of the diameter of the baffle to the diameter of the gas inlet and/or gas outlet may be from about 1:1 to about 5:1, preferably from about 2:1 to about 3:1.

Figure 7:
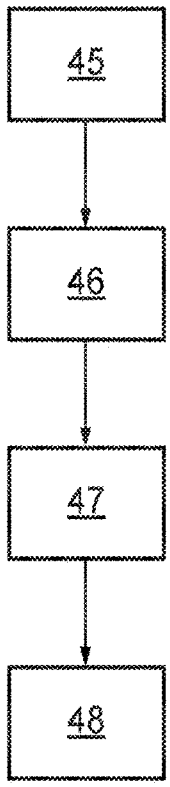
FIG. 7 shows a method according the invention.

Referring to FIG. 7, the present invention provides a method of moderating particulate build-up in a primary flow channel of an exhaust draw amplification device of a gas abatement system.

The method comprises the steps of directing mist-laden air from a gas abatement process through the primary flow channel of the exhaust draw amplification device (45), removing liquid from mist-laden gas that has exited the exhaust draw amplification device (46), and directing at least a portion of said removed liquid back through the primary flow channel of the exhaust draw amplification device in a reverse direction (47). Optionally, after step (47), allowing the liquid to subsequently pass into a packed tower of a wet scrubber (48). Preferably wherein the mist-laden air used in step (45) originated from the packed tow of the wet scrubber. The method optionally including the step of directing a portion of the removed liquid to the wet scrubber without passing through the exhaust draw amplification device.

It will be appreciated that the method of the invention may be performed using the devices disclosed herein.

The invention will be further illustrated by way of the following examples, which are intended to be non-limiting.

EXAMPLE

Test 1

A Y35 Atlas 1200 abatement apparatus with EDAD was modified by removing the mist filter. This allowed the mist from the atomising spray produced in the packed tower to migrate downstream. A clear inspection tube was introduced into the ducting above the EDAD. Water droplets appeared on the clear tube during use, confirming that mist was passing through the EDAD. A drain line from the exhaust extract ducting was required to remove excess water.

While running the modified device, a significant reduction in EDAD blockages and a marked increase in MTBC due to EDAD blockages compared to unmodified devices was recorded.

Test 2

Figure 5:
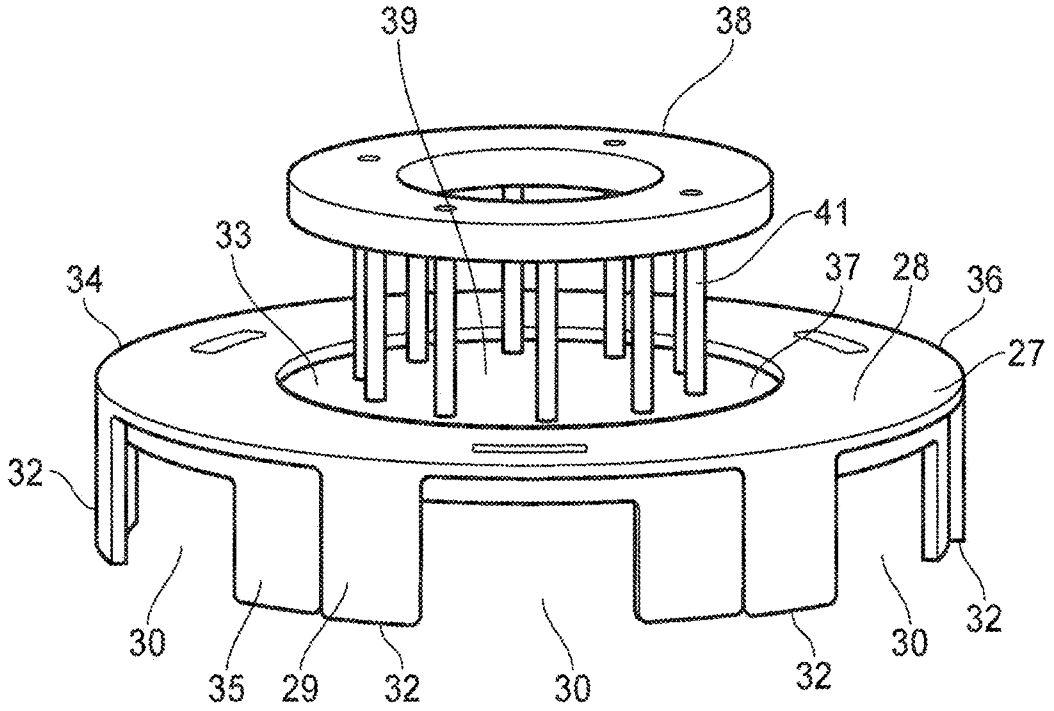
FIG. 5 shows a baffle assembly according to the invention.

A mist-trap as illustrated in FIGS. 3 to 5 was connected directly to the EDAD of a Y35 Atlas 1200 abatement apparatus in a position downstream of the EDAD. The abatement apparatus had again been modified by removing its mist filter. This allowed the mist from the atomising spray produced in the packed tower to wash powder out of the EDAD and travel to the mist-trap.

Polymer drain lines were installed, running from the drainage outlets of the mist-trap to the drain tank below packed tower of the abatement apparatus. A clear inspection tube was connected to the outlet of the mist-trap and to the downstream exhaust ducting.

When the mist-trap baffle was set to fully open, no droplets were observed on the clear polymer tube, indicating that the mist-trap was removing all of the mist. Liquid was observed running down the polymer drain line from the mist-trap to the drain tank.

While running the modified device in combination with the mist-trap, a significant reduction in EDAD blockages and a marked increase in MTBC due to EDAD blockages compared to unmodified devices was recorded.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A mist-trap for a wet-scrubber abatement system, said mist trap comprising a demisting chamber having a gas inlet for receiving mist-laden exhaust gas from a wet-scrubber abatement system, a liquid capture surface on which the mist droplets may coalesce to form a liquid, and a gas outlet through which relatively dry gas may exit the chamber;

wherein the mist trap is configured such that at least a first portion of the captured liquid exits the chamber via the gas inlet to return to the wet-scrubber abatement system; and the mist-trap comprises a baffle comprising a planar main body and a skirt extending perpendicular from the main body adjacent an outer periphery thereof, the skirt defining one or more apertures configured to permit gas to flow around the baffle during use wherein a size of the or each aperture is adjustable.

2. The mist-trap according to claim 1 wherein the liquid capture surface is provided by the baffle at least partially obstructing the gas outlet from the gas inlet.

3. The mist-trap according to claim 1 wherein the demisting chamber comprises at least one drainage outlet through which a second portion of the captured liquid exits the chamber.

4. The mist-trap according to claim 1, wherein the mist-trap is in fluid communication with an exhaust draw amplification device and configured such that liquid exiting the chamber via the gas inlet is directed back into the exhaust draw amplification device.

5. The mist-trap according to claim 4, wherein liquid directed through the exhaust draw amplification device returns to a packed bed abatement chamber.

6. A mist-trap with a water-collecting baffle of a mist trap for a gas abatement system, the baffle comprising a planar main body and a skirt extending perpendicular from the main body adjacent an outer periphery thereof, the skirt defining one or more apertures configured to permit gas to flow around the baffle during use, wherein the side of the planar body from which the skirt extends is configured to provide a liquid capture surface on which mist droplets may coalesce, wherein a size of the or each aperture is adjustable.

7. The baffle according to claim 6 wherein the or each skirt is castellated.

8. An abatement system comprising an exhaust draw amplification device and a mist trap, the exhaust draw amplification device being configured to direct mist-laden gas into the mist trap and the mist-trap being configured to remove liquid from mist-laden gas, and wherein mist-trap is further configured such that at least a portion of the liquid removed from the mist-laden gas is directed back into the exhaust draw amplification device, wherein the mist-trap comprises:

a water-collecting baffle comprising a planar main body and a skirt extending perpendicular from the main body adjacent an outer periphery thereof, the skirt defining one or more apertures configured to permit gas to flow around the baffle during use, wherein the side of the planar body from which the skirt extends is configured to provide a liquid capture surface on which mist droplets may coalesce, wherein a size of the or each aperture is adjustable.

9. The abatement system according to claim 8 wherein the mist-trap further comprises a demisting chamber having a gas inlet for receiving the mist-laden gas, and a gas outlet through which relatively dry gas may exit; and wherein the mist trap is configured such that at least a first portion of the captured liquid exits via the gas inlet to return to a wet-scrubber abatement system.

10. A method of moderating particulate build-up in a primary flow channel of an exhaust draw amplification device of a gas abatement system, the method comprising the steps of:

a. directing mist-laden gas from gas abatement process through the primary flow channel of the exhaust draw amplification device, b. removing liquid from mist-laden gas that has exited the exhaust draw amplification device using a mist-trap comprising:

a water-collecting baffle comprising a planar main body and a skirt extending perpendicular from the main body adjacent an outer periphery thereof, the skirt defining one or more apertures configured to permit gas to flow around the baffle during use, wherein the side of the planar body from which the skirt extends is configured to provide a liquid capture surface on which mist droplets may coalesce, wherein a size of the or each aperture is adjustable, and c. directing at least a portion of said removed liquid back through the primary flow channel of the exhaust draw amplification device in a reverse direction.

11. The method of claim 10 wherein the mist-trap further comprises a demisting chamber having a gas inlet for receiving the mist-laden gas, a liquid capture surface on which mist droplets may coalesce to form the liquid, and a gas outlet through which relatively dry gas may exit.

* * * * *